United States Patent [19]

Fendt et al.

[11] Patent Number: 5,712,784
[45] Date of Patent: Jan. 27, 1998

[54] DATA TRANSMISSION PROCESS WITHIN A DATA PROCESSING SYSTEM SUITABLE FOR USE IN MOTOR VEHICLES

[75] Inventors: Günter Fendt, Schrobenhausen; Hans Spies, Pfaffenhofen; Peter Hora; Derrick Zechmair, both of Schrobenhausen, all of Germany

[73] Assignee: Temic Telefunken microelectronic GmbH, Heilbronn, Germany

[21] Appl. No.: 504,247

[22] Filed: Jul. 19, 1995

[30] Foreign Application Priority Data

Jul. 21, 1994 [DE] Germany .................. 44 25 845.3

[51] Int. Cl.⁶ ........................................ G06F 11/00
[52] U.S. Cl. ........................ 364/424.055; 364/184; 364/424.034; 371/67.1; 280/735
[58] Field of Search ................ 364/184, 424.034, 364/424.039, 424.055, 424.057, 423.098; 371/48, 67.1, 69.1; 280/734, 735; 180/268, 270; 307/10.1

[56] References Cited

U.S. PATENT DOCUMENTS

| | | | |
|---|---|---|---|
| 5,099,444 | 3/1992 | Wilson et al. | 364/709.09 |
| 5,220,522 | 6/1993 | Wilson et al. | 364/709.09 |
| 5,243,606 | 9/1993 | Sugita et al. | 371/69.1 |
| 5,459,732 | 10/1995 | Wise et al. | 364/426.021 |

FOREIGN PATENT DOCUMENTS

| | | |
|---|---|---|
| 0 471 871 | 2/1992 | European Pat. Off. |
| 3640351A1 | 6/1988 | Germany |
| 3811217A1 | 10/1989 | Germany |

OTHER PUBLICATIONS

ASAUMI, TOSHIO; Air Bag Starting Controller, *Patent Abstracts of Japan*, M-1488, Sep. 29, 1993, vol. 17, No. 541.

*Primary Examiner*—Collin W. Park
*Attorney, Agent, or Firm*—Spencer & Frank

[57] ABSTRACT

A trigger circuit for occupant protection systems in motor vehicles comprises a control unit which will effect the triggering of a means of restraint such as an airbag, depending on sensor signals generated by one or more external sensor units. To achieve a degree of triggering certainty, data interrogation must take place in very short time intervals. A safe transmission of data between the control unit and the sensor units will be ensured if, in accordance with this invention, the information units to be transmitted will each be encoded by means of a PWM signal with a certain period duration. The control unit will check the period duration of the PWM signal received, and, in the event of this actual period duration not matching the specified nominal value, it will not accept the relevant unit of information.

8 Claims, 2 Drawing Sheets

| FUNCTION | HIGH | LOW | SUM | |
|---|---|---|---|---|
| 1 | 80 | 420 | 500 | [µs] |
| 2 | 176 | 324 | 500 | |
| 3 | 272 | 228 | 500 | |
| 4 | 368 | 132 | 500 | |
| 5 | 432 | 68 | 500 | |

DATA TRANSMISSION PROCESS WITHIN A DATA PROCESSING SYSTEM SUITABLE FOR USE IN MOTOR VEHICLES

BACKGROUND OF THE INVENTION

This invention concerns a data transmission process within a data processing system suitable for use in motor vehicles, comprising one control unit and at least one peripheral unit connected to the control unit via a data line, as well as a data processing system for implementing the process according to this invention.

Today, the occupants of motor vehicles will usually be effectively protected by restraint systems such as airbags for drivers as well as for passengers, and belt tensioners, if their vehicle is in a head-on collision with an obstacle or another vehicle. To drive each of these restraint systems, an output stage will be required which is centrally monitored and controlled by a control unit, also known as an airbag triggering device. Furthermore, it is known that side airbags are provided for drivers as well as for passengers; these side airbags will be released in the event of a collision or an impact occurring from the side of the vehicle, thus additionally ensuring the safety of vehicle occupants if such a side collision should occur. The triggering time required for such a side airbag, when compared to the available time period for triggering driver and passenger airbags in the event of a head-on collision, will be extremely small due to the short deformation path in the event of a side crash. In addition to the existing acceleration sensors in the central airbag control device, it will therefore be necessary to provide additional, and at least two, external sensors—all, respectively, located in the door area—allowing the short triggering times required to be implemented. The requirement for these additional external sensors is mandatory as the acceleration signal supplied by the existing sensor inside the central airbag control device cannot be evaluated due to the greater distance to the force input point; at the time of the triggering time required, this acceleration signal will not yet have reached the central area of the vehicle where the central acceleration sensor is located.

In order to be able to maintain these short triggering times of less than 5 msec, these external sensors must be continuously interrogated by the central control unit. These inquiry data concern different system states and must be safely transmitted in even shorter time intervals. The transmission frequency is subject to an upper limit, as high frequencies require screened cabling; but, for reasons of cost, this is not desirable. Moreover, the fast switching edges occurring at high frequencies would cause high interference levels; for this reason, the maximum transmission frequency in a data line should not exceed 20 kHz. Finally, the central control unit would need to be provided with a dedicated serial interface for each external sensor in order to read in the serial data. Thus, the central control unit would need to be provided with at least two such serial interfaces, namely, one interface to the external sensor on the left-hand side of the motor vehicle as well as one interface to the external sensor on the right-hand side of the motor vehicle. As usually trade standard microprocessors are used as control units, and as these microprocessors usually have only one serial interface, they cannot be used for this purpose. Even reading in the data by means of a multiplex process will not be possible as both external sensors must be interrogated simultaneously.

SUMMARY OF THE INVENTION

The object of the invention is to provide a data transmission process within a data processing system suitable for use in motor vehicles which will allow safe data transmission within a predetermined time interval such that a garbled data transmission becomes clearly detectable.

According to the invention, the peripheral device will generate a pulse width modulated signal (PWM signal) in order to transmit one unit of information, with the period duration of the PWM signal having been preset as a nominal value. Thus, each unit of information will be transmitted within a certain time interval corresponding to the period duration of the PWM signal. Now, the period duration for each transmitted PWM signal will be determined mid compared to the originally preset period duration. If these do not match, that particular transmitted trait of information will not be accepted by the control unit. In this way, a garbled data transmission can be clearly detected and the relevant information content ignored.

In an advantageous further application of the process according to this invention, data transfer between the periphery and the control unit will be effected by means of an interrupt signal generated by the peripheral unit. A microprocessor used as a control unit is usually provided with several capture inputs for the relevant transmission type. This data transmission method does not use synchronization as transmissions will be automatically synchronized by the interrupt signals. When this interrupt process is used, information units will preferably be transmitted serially, with the level change for transmitting the first unit of information serving as interrupt signal.

The data transmission process according to this invention will be particularly suitable for data processing systems which are used in motor vehicles. Here, a control unit will be used as a trigger circuit for occupant protection systems, which trigger circuit will be connected—via one data line each—with several external sensor units as peripheral devices. Such external sensor units are used, for instance, as crash sensors for detecting a side collision of a motor vehicle which will cause the respective side airbag to be triggered. Preferably, data transmission duration for one unit of information—this corresponds to the period duration of one PWM signal—will be 500 μsec. This enables the required fast triggering times of less than 5 msec to be maintained as the request for trigger standby will be effected within this cycle time of 500 μsec. The information provided by the external sensors will thus be interrogated every 500 μsec by the control unit, corresponding to a data inquiry rate of 2 kHz.

BRIEF DESCRIPTION OF THE DRAWINGS

The data transmission process by means of a data processing system suitable for use in motor vehicles, as provided for by this invention, is to be elucidated below in conjunction with the drawings, wherein.

DESCRIPTION OF THE PREFERRED EMBODIMENTS

Figure 1:
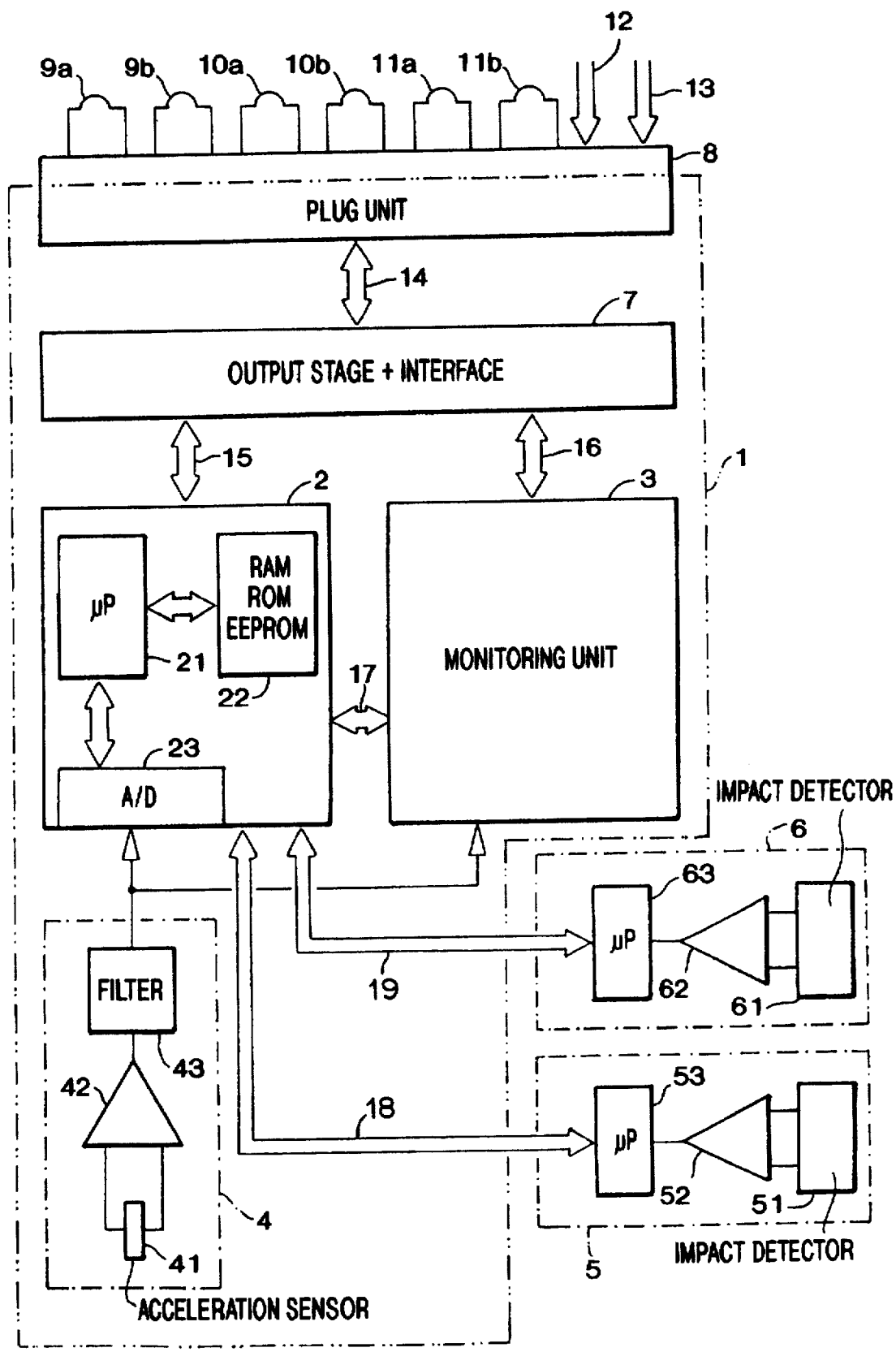
FIG. 1 is a block diagram of a control unit for an occupant protection system to implement the process according to this invention.

The trigger circuit 1 illustrated in FIG. 1 is used as a control unit for a safety device in motor vehicles—for instance, driver, passenger, and side airbags—and comprises a central accleration transducer 4, a central processing unit 2, a monitoring unit 3, an output stage and interface circuit 7, and lastly a plug unit 8 making the connection to the trigger agents, i.e. the trigger pellets of the airbags. Finally, this trigger circuit 1 provides for two so-called external sensor units 5 and 6 to be connected via a line 18 or 19 with the central processing unit 2. These sensor units 5 and 6, provided for detection of a side impact, usually comprise— as sensors—impact or touch detectors, or they are designed as pre-crash sensors, and to this end are located in the vicinity of the door area of the motor vehicle. The components making up trigger circuit 1 are all arranged on an electronic board, and, together with a casing, located in a central position inside the motor vehicle. The acceleration transducer 4 of trigger circuit 1 comprises an acceleration sensor 41 whose sensor signals will first be amplified by means of an amplifier unit 42 and then be freed from interference pulses by a filter circuit 43. These filtered sensor signals will be digitized by an A/D converter circuit 23 of central processing unit 2 and fed to another CPU 21 for evaluation. The central processing unit 2 also comprises a memory arrangement 22, in which—amongst other things—a trigger algorithm is stored.

The above-mentioned central processing unit 2 will also be supplied with the sensor signals of the two external sensor units 5 and 6, via the above-mentioned data lines 18 and 19. These two sensor units 5 and 6 are, respectively, identical in their setup and comprise, for instance, an impact detector 51 or 61, an amplifier unit 52 or 62 for amplification of the sensor signals fed in, as well as a microprocessor 53 or 63, which has the sole purpose of detecting a side impact and pass the relevant information to central processing unit 2.

As the trigger circuit 1 must be functional during the entire service life of a motor vehicle, this trigger circuit 1 additionally comprises a so-called monitoring unit 3 which generates test and reference pulses for testing sensor circuits 4, 5, and 6, as well as central processing unit 2. This monitoring unit 3 is connected via line 17 with central processing unit 2. The digital sensor signals of the external sensor units 5 and 6 will be transmitted to this monitoring unit 3 via central processing unit 2 and line 17.

The aforementioned circuit block 7 comprises the output stages for driving the trigger agents, that is, the trigger pellets for the airbags, and is also used as an interface between the load current circuits, containing the trigger agents, in the output stages, central processing unit 2, and monitoring unit 3. In addition, the signals from a seat occupancy detection system will be fed in by means of a line 12, and diagnosis signals by means of a further line 13, via plug unit 8 and one line 14. Via this line 14 and the plug unit 8, the output stage signals will be supplied to a driver airbag 9a, a passenger airbag 9b, a side airbag 10a, a side airbag 10b, as well as belt tensioner units 11a and 11b for driver and passenger.

In the event of a side impact occurring, triggering times, when compared to the available time period for triggering driver and passenger airbags in the event of a head-on collision, will be extremely small due to the short deformation path in the event of a side crash, and must usually be less than 5 msec. These small triggering times will be required as the acceleration signal inside acceleration unit 4 of trigger circuit 1, centrally arranged in the motor vehicle, cannot yet be evaluated due to the greater distance to the force input point; at the time of the triggering time required, this acceleration signal will not yet have reached the central area of the vehicle. Therefore, the digital sensor signals generated by the external sensor units 5 and 6 must additionally be evaluated by central processing unit 2. Here, a trigger standby condition within a cycle time of 500 μsec will be required for the side airbags. Thus, the central processing unit 2 must interrogate and evaluate the information provided by external sensors every 500 μsec. This corresponds to a data inquiry rate of 2 kHz. For instance, information needs to be inquired relative to the following functions:

Function 1: system works without any fault,
Function 2: system wants to trigger,
Function 3: system is in an alert mode (corresponds to the beginning of a crash),
Function 4: system is close to the triggering threshold, and
Function 5: system will detect a side impact on the opposite side.

Figures 2, 3:
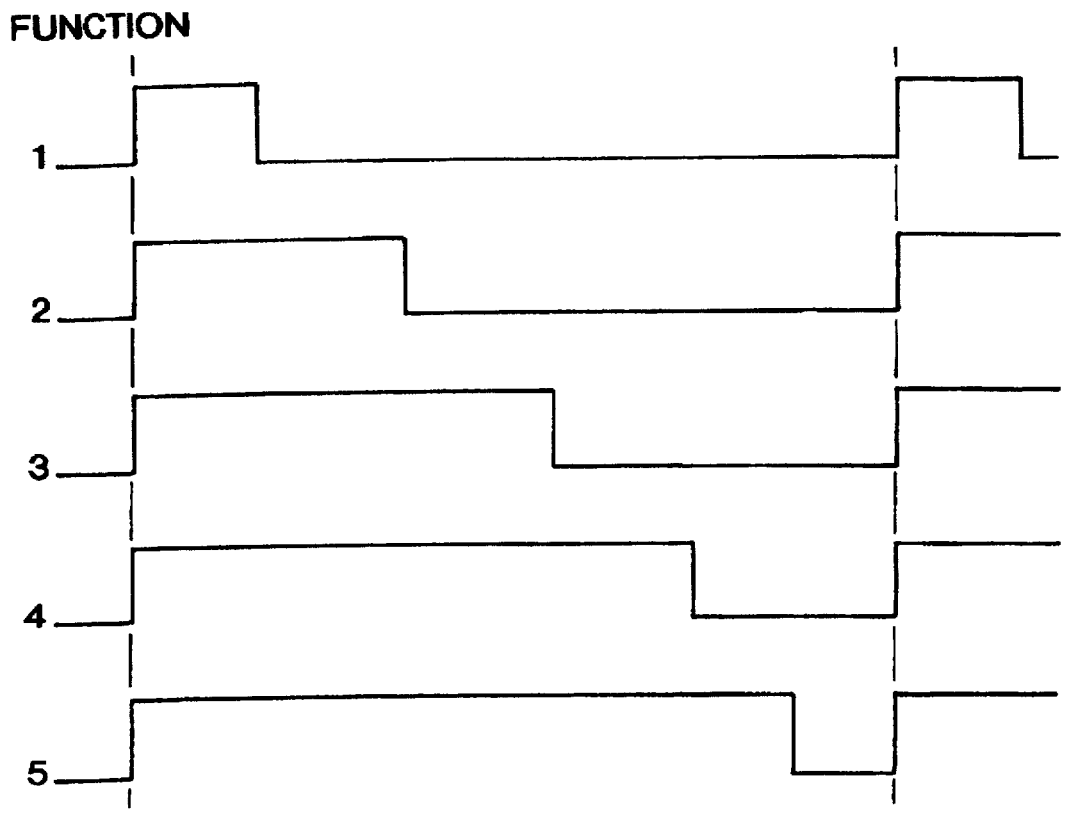
FIG. 2 is a pulse schematic of different PWM signals for transmitting different data contents.
FIG. 3 is a listing of pulse-pause ratios for the PWM signals illustrated in FIG. 2.

These five functions will respectively be transmitted as data every 500 μsec by means of a PWM signal (pulse width modulated signal) generated by sensor units 5 and 6. The relevant pulse diagram for transmitting each of the above-named functions is shown in FIG. 2. Here, the data information will be encoded by the pulse duty ratio—as can be seen, for instance, from FIG. 2, and is shown by way of example, using concrete values, in FIG. 3. The sum of pulse duration—which is equivalent to the High level on the line—and pulse pause—which is equivalent to the Low level of the line—will be approximately 500 μsec for each PWM signal.

Fault monitoring will be implemented by the central processor unit 2 of trigger circuit 1 monitoring pulse duration, i.e. in the present case the time period of 500 μsec. Thus, for example, the time duration between two rising or two falling edges will be evaluated. If this time duration does not amount to 500 μsec approximately, a fault signal is in the data line. By this means, a garbled data transmission will be clearly detected by the central processor unit 2; this detection causes the relevant data content not to be accepted by central processor unit 2.

In spite of the low transmission frequency in the data lines of external sensor units 5 and 6, the required small triggering times can be maintained. Simultaneously, due to the low transmission frequency, screened cabling need not be used for these data lines.

According to FIG. 1, both data lines 18 and 19 are connected to so-called capture inputs of central processing unit 2. These are inputs capable of interrupt handling. A relevant interrupt signal will be generated by sensor units 5 and 6, and will for instance represent a first level change of a PWM signal. This obviates the need for continuous interrogation of inputs, thus saving valuable computer capacity. In addition, this interrupt method obviates the need for synchronisation as transmissions will automatically synchronize by means of the interrupt signals on the capture inputs.

The data transmission process according to this invention may not only be used to advantage for control units with external sensors for triggering airbags and belt tensioners, as shown in FIG. 1, but also in engine management. Here, external sensor units 5 and 6 would be replaced by temperature, pressure, and air volume sensors.

What is claimed is:

1. A data transmission process within a data processing system suitable for use in motor vehicles and comprising one control unit and at least one peripheral unit connected to the control unit via a data line, said process comprising the steps of:

setting a period duration of a pulse width modulated (PWM) signal suitable for use with the control unit as a nominal value;

generating an actual pulse width modulated signal (PWM signal) by the at least one peripheral unit as the smallest unit of information;

transmitting the PWM signal to the control unit;

determining the period duration as an actual value of the transmitted PWM signal;

comparing the actual value with the nominal value; and, if the actual and nominal values do not match, disregarding that particular transmitted unit of information represented by the PWM signal in the control unit.

2. A data transmission process according to claim 1 including effecting a data transfer by an interrupt signal generated by the peripheral unit.

3. A data processing system for use in motor vehicles to implement the process according to claim 2 wherein said control unit is a trigger circuit for an occupant protection system, with the trigger circuit being connected via a respective data line with each of several sensor units as peripheral units for transmitting PWM signals of a predetermined nominal period duration, and wherein the trigger circuit includes means for determining the actual value of the period duration of a received PWM signal, for comparing the actual value with the predetermined nominal value, and for disregarding the information unit represented by the PWM signal during the determined pulse duration if the compared actual and nominal values do not match.

4. A data processing system according to claim 3 wherein the nominal value for the period duration of each PWM signal is 500 μsec.

5. A data transmission process according to claim 1 including serially effecting the data transmission.

6. A data transmission process according to claim 5 including using a level change for transmitting the first unit of information as an interrupt signal to effect a data transfer to the control unit.

7. A data processing system for use in motor vehicles to implement the process according to claim 6 wherein said control unit is a trigger circuit for an occupant protection system, with the trigger circuit being connected via a respective data line with each of several sensor units as peripheral units for transmitting PWM signals of a predetermined nominal period duration, and wherein the trigger circuit includes means, responsive to receipt of the interrupt signal, for effecting a data transfer, for determining the actual value of the period duration of a received PWM signal, for comparing the actual value with the predetermined nominal value, and for disregarding the information unit represented by the PWM signal during the determined pulse duration if the compared actual and nominal values do not match.

8. A data processing system according to claim 7 wherein the nominal value for the period duration of each PWM signal is 500 μsec.

* * * * *